(12) United States Patent
Custance

(10) Patent No.: US 12,365,441 B2
(45) Date of Patent: Jul. 22, 2025

(54) SPOILER

(71) Applicant: AIRBUS OPERATIONS LIMITED, Bristol (GB)

(72) Inventor: Denys Custance, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/422,761

(22) Filed: Jan. 25, 2024

(65) Prior Publication Data

US 2024/0253772 A1    Aug. 1, 2024

(30) Foreign Application Priority Data

Jan. 26, 2023    (GB) ...................................... 2301109

(51) Int. Cl.
   *B64C 9/32*     (2006.01)
   *B64C 9/02*     (2006.01)
   *B64C 9/34*     (2006.01)
   *B64C 30/00*    (2006.01)

(52) U.S. Cl.
   CPC .............. *B64C 9/323* (2013.01); *B64C 9/02* (2013.01); *B64C 9/34* (2013.01); *B64C 30/00* (2013.01)

(58) Field of Classification Search
   CPC ........... B64C 9/146; B64C 9/323; B64C 9/02; B64C 3/58
   See application file for complete search history.

(56) References Cited

U.S. PATENT DOCUMENTS

| | | | | |
|---|---|---|---|---|
| 1,858,259 | A | * 5/1932 | Heraclio | ................... B64C 9/22 244/214 |
| 2,164,531 | A | * 7/1939 | Lee | .......................... B64C 9/32 244/113 |
| 3,064,930 | A | 11/1962 | Chevalier | |

(Continued)

FOREIGN PATENT DOCUMENTS

| CN | 106240802 A | 12/2016 |
|---|---|---|
| CN | 109515689 A | 3/2019 |

(Continued)

OTHER PUBLICATIONS

Clarence DeSilva. "Mechanics of Materials." CRC Press. 2014. pp. 279-348 (Year: 2014).*

(Continued)

*Primary Examiner* — Joshua J Michener
*Assistant Examiner* — Michael B. Kreiner
(74) *Attorney, Agent, or Firm* — Nixon & Vanderhye P.C.

(57) ABSTRACT

An aircraft wing including a wing structure supporting a wing cover having an outer aerodynamic surface, and a pop-up spoiler unit including an actuation mechanism and a spoiler coupled to the actuation mechanism. The spoiler is moveable by the actuation mechanism to deploy through an aperture in the wing cover. The pop-up spoiler unit is mounted to the wing structure to be substantially isolated from wing bending deflections. The wing structure has a neutral plane which is substantially neither stretched nor compressed during bending of the wing structure. The pop-up spoiler unit is mounted to the wing structure at only two pin joints each having a respective pin axis about which the pop-up spoiler unit is substantially free to rotate, and each pin axis substantially lies in the neutral plane.

17 Claims, 2 Drawing Sheets

(56) References Cited

U.S. PATENT DOCUMENTS

| | | | | |
|---|---|---|---|---|
| 3,318,555 | A * | 5/1967 | Swogger | B64C 9/323 244/90 A |
| 4,693,437 | A * | 9/1987 | Khachikian | B64C 13/30 244/225 |
| 4,783,024 | A * | 11/1988 | McDaniel | B64C 9/323 244/113 |
| 6,766,981 | B2 * | 7/2004 | Volk | B64C 9/32 244/90 A |
| 7,891,612 | B2 * | 2/2011 | Mahmoudi | B64C 9/32 244/215 |
| 8,418,954 | B2 * | 4/2013 | Allen | B64C 3/58 74/105 |
| 9,580,163 | B2 * | 2/2017 | Sun | B64C 1/069 |
| 11,767,100 | B2 * | 9/2023 | Bishop | B64C 13/30 244/99.3 |
| 11,780,564 | B2 * | 10/2023 | Bishop | B64C 9/26 244/99.3 |
| 12,071,221 | B2 * | 8/2024 | Bishop | B64C 9/22 |
| 12,116,109 | B2 * | 10/2024 | Healy | B64C 13/38 |
| 2009/0308976 | A1 | 12/2009 | Benthien et al. | |
| 2013/0320149 | A1 | 12/2013 | Fraysse et al. | |
| 2019/0375493 | A1 * | 12/2019 | Schwindt | B64C 9/146 |
| 2022/0144412 | A1 | 5/2022 | Bishop et al. | |

FOREIGN PATENT DOCUMENTS

| | | |
|---|---|---|
| DE | 733504 C | 3/1943 |
| DE | 202015102982 U1 | 6/2015 |
| EP | 3995394 A1 | 5/2022 |
| WO | WO-2024223153 A1 * | 10/2024 ............... B64C 3/58 |

OTHER PUBLICATIONS

Greiner, Michael, et al. "Dilemma Resolved: Airbrakes Tamed." Technical Soaring, vol. 42 No. 4. Oct. 2018. (Year: 2018).*

Indriyanto et al. "Design of Flight Control System Mechanism for National Glider GL-1." The International Conference on Aerospace and Aviation. 2019. (Year: 2019).*

Hayward, Justin. "Why Do Boeing 787 Wings Curve So Much At Take Off?" Simpleflying.com. Feb. 26, 2021. (Year: 2021).*

"787 Airplane Characteristics for Airport Planning." Doc. No. D6-58333. Boeing Commercial Airplanes. Feb. 2023. (Year: 2023).*

European Search Report cited in EP 24153238.1 mailed May 24, 2024, 8 pages.

* cited by examiner

SPOILER

RELATED APPLICATION

This application incorporates by reference and claims priority to United Kingdom patent application GB 2301109.1, filed on Jan. 26, 2023.

FIELD OF THE INVENTION

The present invention relates to an aircraft wing with a pop-up spoiler unit.

BACKGROUND

Aircraft wing spoilers are used to disrupt lift produced by the wing and also increase drag. They are moveable between a retracted and a deployed position. Traditional spoilers for large aircraft are mounted on the upper wing surface near the wing trailing edge, often just forward of trailing edge flaps, and are deployed by rotating upwardly into the oncoming airflow.

More recently, there has been increased interest in a type of spoiler known as a pop-up spoiler, which moves from a retracted to an extended position by translating the spoiler substantially vertically through the aircraft wing. Pop-up spoilers have been used primarily on gliders to date.

Aircraft wings are subject to bending load deflections and this can present challenges for mounting pop-up spoilers.

SUMMARY

A first aspect of the invention provides an aircraft wing comprising a wing structure supporting a wing cover having an outer aerodynamic surface, and a pop-up spoiler unit including an actuation mechanism and a spoiler coupled to the actuation mechanism, wherein the spoiler is moveable by the actuation mechanism to deploy through an aperture in the wing cover, and wherein the pop-up spoiler unit is mounted to the wing structure so as to be substantially isolated from wing bending deflections.

By substantially isolated, in this context it is meant that the wing bending deflections are substantially not transferred to impart loads (bending, compressive, tensile, etc.) to the pop-up spoiler unit. The transfer of any significant loads to the pop-up spoiler unit may be detrimental to the operation of the spoiler actuation mechanism, and therefore spoiler deployment or retraction.

The wing covers may include structural wing covers forming part of a wing box of the wing and/or leading and trailing edge cover panels.

The wing structure may have a neutral plane, and wherein the pop-up spoiler unit is mounted to the wing structure at locations substantially lying in the neutral plane only. The neutral plane of the wing in this context is the conceptual surface through the cantilevered wing which is unstressed, either in tension or compression, as the cantilever wing bends. The neutral plane is not necessarily flat, it may be a curved conceptual surface.

The pop-up spoiler unit may be mounted to the wing structure by pin joints about which the pop-up spoiler unit is substantially free to rotate. A pin joint is otherwise known as a revolute joint.

Each pin joint may include a pin having a pin axis oriented substantially transverse to a spanwise axis of the wing. Preferably, the pin axis lies substantially in the neutral plane and substantially normal to the local constant percentage chord line of the wing.

Each pin joint may constrain relative motion of the wing structure and the pop-up spoiler unit to pure rotation along the pin axis.

The pop-up spoiler unit may be mounted to the wing structure by a pair of the pin joints, one of the pair of pin joints being located at each end of the pop-up spoiler unit.

The spoiler may have a length extending substantially in a spanwise direction of the wing, and a height extending substantially in a thickness direction of the wing.

The spoiler may be configured to deploy through an upper aerodynamic surface of the wing.

The aperture may be an elongate slot.

The spoiler may be arranged to move in a direction substantially normal to an outer aerodynamic surface of the wing cover.

The spoiler may be moveable between a retracted and an extended position, and wherein the spoiler does not extend beyond an aerofoil profile of the wing when the spoiler is in the retracted position. In other words, the spoiler remains entirely within the aerodynamic surface of the wing when the spoiler is retracted.

The spoiler may carry a panel forming a substantially flush surface with an outer aerodynamic surface of the wing cover when the spoiler is in the retracted position.

The spoiler unit may occupy substantially a full depth of the wing between upper and lower aerodynamic surfaces thereof.

The actuation mechanism may be operable to move the spoiler without jamming during wing bending deflections under all normal operating conditions of the aircraft wing.

A further aspect of the invention provides an aircraft including the aircraft wing of the first aspect.

The actuation mechanism may be operable to move the spoiler when the aircraft is in flight or is on the ground under all normal operating conditions of the aircraft.

The aircraft may be a subsonic or transonic large transport aircraft.

A yet further aspect of the invention provides an aircraft wing comprising a wing structure supporting a wing cover having an outer aerodynamic surface, and a pop-up spoiler unit including an actuation mechanism and a spoiler coupled to the actuation mechanism, wherein the spoiler is moveable by the actuation mechanism to deploy through an aperture in the wing cover, wherein the wing structure has a neutral plane which is substantially neither stretched nor compressed during bending of the wing structure, and the pop-up spoiler unit is mounted to the wing structure at only two pin joints each having a respective pin axis about which the pop-up spoiler unit is substantially free to rotate, and each pin axis substantially lies in the neutral plane.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
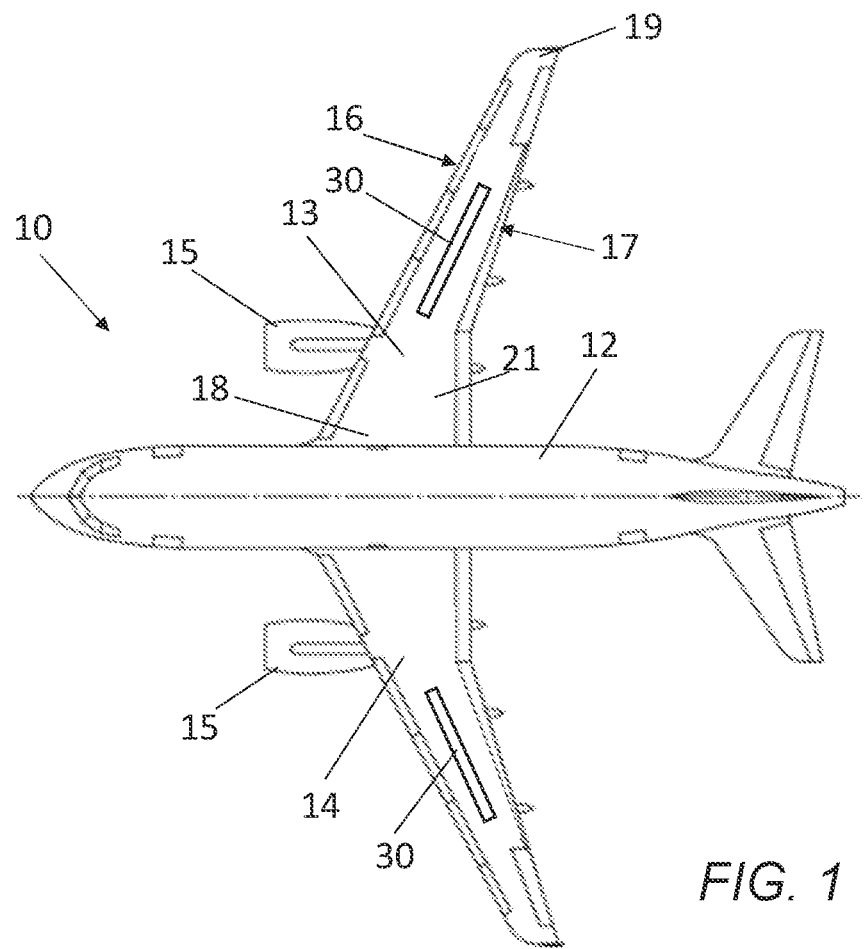
FIG. 1 shows a plan view of an aircraft having pop-up spoilers on the wings.

FIG. 1 shows an aircraft 10. The aircraft 10 has a fuselage 12, and starboard and port fixed wings 13, 14. An engine 15 is mounted to each wing 13, 14. The aircraft 10 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

Each wing has a cantilevered wing structure with a length extending in a spanwise direction from a root 18 to a tip 19, with the root 18 being joined to the aircraft fuselage 12. The wings 13, 14 are similar in construction and so only the starboard wing 13 will be described in detail. The wing 13 has a leading edge 16 and a trailing edge 17. The leading edge 16 is at the forward end of the wing and the trailing edge 17 is at the rearward end of the wing.

The wing 13 may comprise a wing box 20. The wing box 20 forms a structural assembly including forward and rear spars (part of the rear spar shown in FIG. 2), ribs extending between the forward and rear spars. The wing 13 may alternatively have a multi-spar construction. Regardless of the wing structure, the wing has upper and lower wing covers, 21, 22 and leading and trailing edge cover panels (collectively the "wing covers"), which form part of the outer aerodynamic surface of the wing. The wing 13 has an upper aerodynamic surface between the leading and trailing edges 16, 17 and a lower aerodynamic surface between the leading and trailing edges of the wing.

The wing 13 has a spanwise axis S which extends in a direction from the wing root 18 to the wing tip 19, and a chordwise axis which extends in the direction from the leading edge 16 to the trailing edge 17. The wing 13 has an aerofoil cross section. The wing 13 has a thickness direction perpendicular to the chordwise and spanwise directions.

Figure 2:
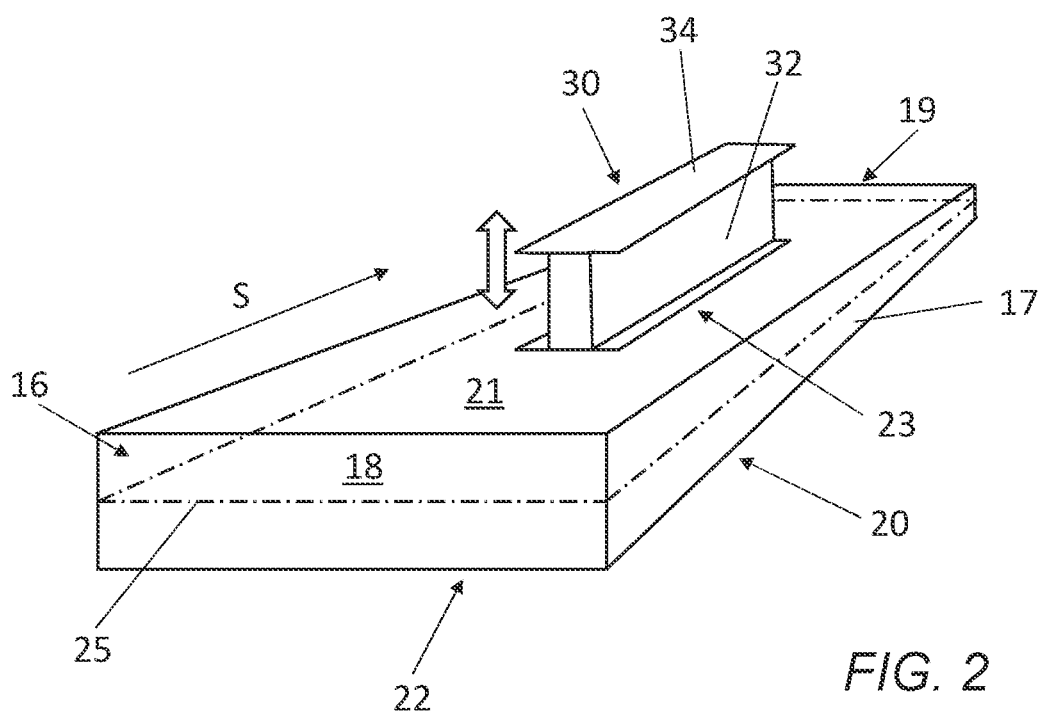
FIG. 2 shows a schematic perspective view of an aircraft wing structure with a pop-up spoiler in the deployed position.

The wing 13 has a pop-up spoiler unit 30 as best shown in FIG. 2. The pop-up spoiler unit comprises an actuation mechanism 31 and a spoiler 32 coupled to the actuation mechanism. The spoiler 32 is moved by the actuation mechanism 31 to translate along substantially a single linear axis without rotation. The spoiler is arranged to move substantially vertically in a direction substantially normal to the outer aerodynamic surface of the upper wing cover, e.g. wing cover 21. The spoiler 32 is moveable by the actuation mechanism 31 to deploy through an aperture 23 in the upper wing cover 21. Alternatively, the spoiler 32 is moveable by the actuation mechanism 31 to deploy through an aperture in another of the wing covers, e.g. a leading edge cover panel or a trailing edge cover panel on the upper or lower surface of the wing. The spoiler 32 is configured to move between a retracted position in which the spoiler is fully within the aerofoil profile of the wing 13, and an extended position in which the spoiler extends above the surface of the upper wing cover 21. The spoiler 32 may have a plurality of extended positions.

The spoiler 32 is arranged as a substantially flat wall or thick plate facing the oncoming airflow over the wing aerodynamic surface when the spoiler is in the extended position. The spoiler 32 may have a length extending substantially in a spanwise direction of the wing, and a height extending substantially in a thickness direction of the wing. The length of the spoiler 32 may be several times its height. With the spoiler 32 facing the oncoming airflow, the actuation mechanism 31 may be behind the thick plate so as to be protected by the spoiler from high speed airflow.

Figure 3:
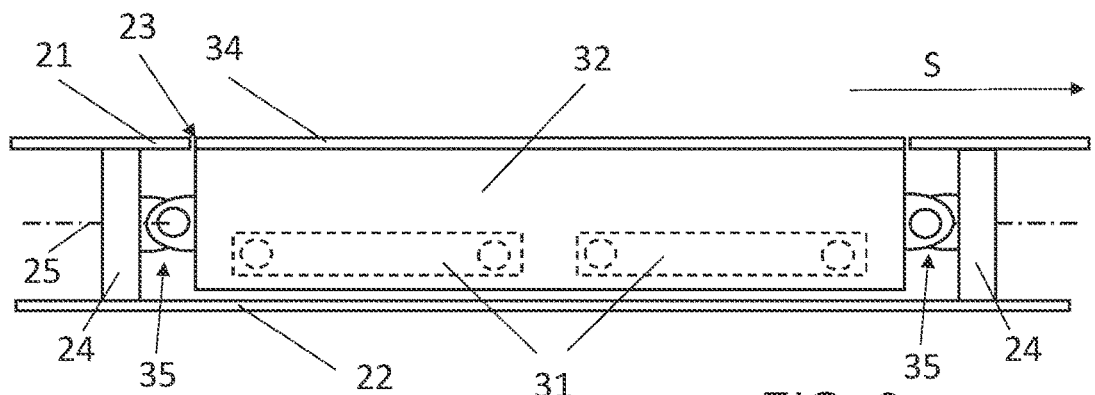
FIG. 3 shows a schematic spanwise sectional view of the aircraft wing structure with the pop-up spoiler retracted.

The aperture 23 in the wing cover may be an elongate slot, preferably a substantially rectangular slot. The spoiler 32 may carry a panel 34. The panel 34 has an upper surface which forms a substantially flush surface with an outer aerodynamic surface of the upper wing cover, e.g. wing cover 21, when the spoiler 32 is in the retracted position. The panel 34 may be a substantially flat plate affixed to the top of the spoiler 32 to form a 'top hat'. The panel 34 moves with the deployment and retraction of the spoiler 32. The panel 34 may have a slightly curved surface to match the aerofoil profile of the wing 13 (i.e. the shape of the outer aerodynamic surface of the wing cover(s)) when the panel 34 occupies the aperture 23. FIG. 3 shows the spoiler 32 in the retracted position.

Figure 4:
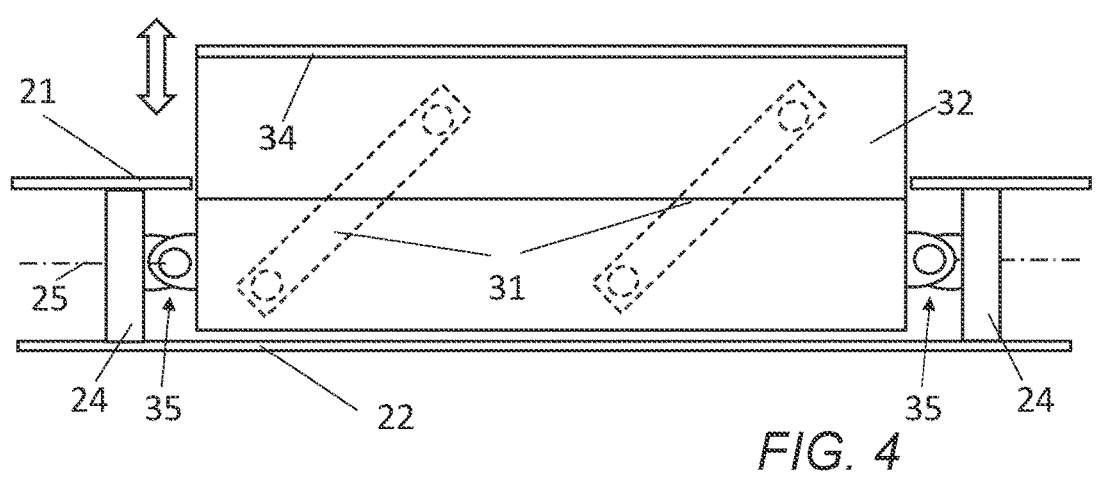
FIG. 4 shows a schematic spanwise sectional view of the aircraft wing structure with the pop-up spoiler deployed.

By activating the actuation mechanism 31 to move the spoiler from the retracted position to the fully extended position, shown in FIG. 4, the spoiler 32 is moved through the aperture 23. The panel 34 atop the spoiler 32 lies substantially parallel with the outer aerodynamic surface of the upper wing cover, e.g. wing cover 21, so that in the extended position of the spoiler the panel 34 is substantially aligned with the oncoming airflow over the wing 13.

The pop-up spoiler unit 30 is mounted to the internal wing structure 24 between the upper and lower aerodynamic surfaces of the wing. The pop-up spoiler unit 30 is mounted to the internal wing structure 24 in such a way as to be substantially isolated from wing bending deflections. As shown in FIG. 2, the wing 13 has a neutral plane 25. The neutral plane 25 of the wing 13 is the conceptual surface, shown as a surface bounded by a dot-dash broken line, through the cantilevered wing which is unstressed, either in tension or compression, as the cantilever wing bends. The neutral plane is not necessarily flat, it may be a curved conceptual surface. The neutral plane 25 lies substantially midway between the upper and lower wing covers defining the upper and lower aerodynamic surfaces of the wing at a particular wing chord location.

The neutral plane 25 is shown as a line in the cross section views of FIGS. 3 and 4 through the wing. As can be seen the pop-up spoiler unit 30 is mounted to the wing structure at locations substantially lying in the neutral plane only. In this way, the pop-up spoiler 30 mountings are at locations that are not stressed, either in tension or compression, as the cantilever wing 13 bends. Therefore, as the wing bends, the spanwise spacing between the mounting locations of the pop-up spoiler unit 30 substantially does not change and so the wing bending loads, which cause extension and contraction away from the neutral plane in the spanwise direction during wing bending, are not transferred into the pop-up spoiler unit 30.

This is beneficial as the wing bending deflections and loads are therefore isolated from the pop-up spoiler unit 30, so the pop-up spoiler unit 30 is not stressed and does not deform under the wing bending loads. This ensures that the actuation mechanism 31 of the pop-up spoiler unit is not subjected to stresses from the wing bending loads and so jamming of the actuation mechanism can be prevented. It is important that the actuation mechanism 31 is operable to move the spoiler 32 without jamming during wing bending deflections under all normal operating conditions of the aircraft wing 13, including when the aircraft 10 is in flight or is on the ground. Even small deflections of the pop-unit spoiler unit may be sufficient to cause the actuation mechanism to jam or at least lead to an unacceptable increase in load on an actuator of the actuation mechanism, and therefore need to be avoided.

The pop-up spoiler unit 30 occupies substantially a full depth of the wing between upper and lower aerodynamic surfaces thereof, as shown in FIG. 3. The spoiler 32 is substantially rigid to ensure that it does not significantly deflect under the high aerodynamic loads when in the extended position, even for a large transonic aircraft if deployed at cruise speeds, e.g. around Mach 0.8.

The pop-up spoiler unit 30 is mounted to the wing structure 24 by pin joints 35 (also known as revolute joints) about which the pop-up spoiler 30 unit is substantially free to rotate. Each pin joint 35 includes a pin having a pin axis oriented substantially transverse to a spanwise axis S of the wing 13 (the pin axis is into the page in FIGS. 3 and 4). The pin axis lies substantially in the neutral plane and substantially normal to the local constant percentage chord line of the wing. The pop-up spoiler unit 30 is mounted to the wing structure at only two pin joints 35, each pin axis substantially lies in the neutral plane 25. Each pin joint 35 constrains relative motion of the wing structure 24 and the pop-up spoiler unit 30 to pure rotation along the pin axis. The pop-up spoiler unit 30 is mounted to the wing structure 24 by only two of the pin joints 35, one of the pin joints being located at each end of the pop-up spoiler unit in the spanwise direction S.

Figure 5:
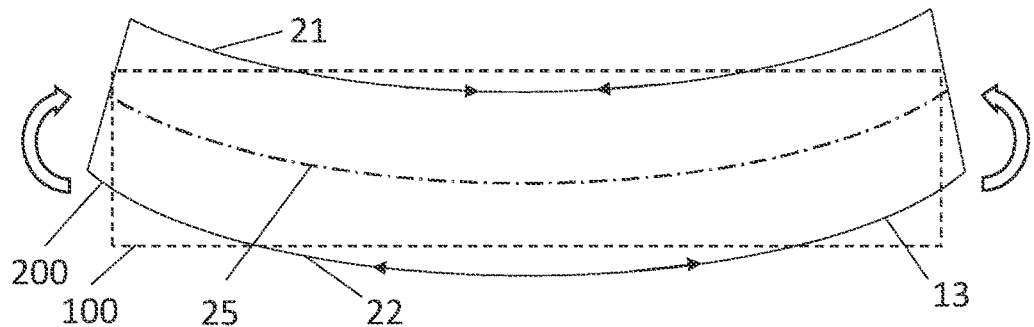
FIG. 5 shows a schematic view of the wing structure under spanwise bending, showing the neutral plane.

FIG. 5 shows schematically the wing 13 in an undeflected state 100 (no wing bending) in dotted broken line, and the wing 13 in a deflected state 200 (under wing bending) in solid line. In the deflected state with bending moment applied as shown by the arrows the upper wing cover, e.g. wing cover 21, is under compression and the lower wing cover, e.g. wing cover 22, is under tension. The neutral plane 25 is again shown in dot dash broken line where the cantilevered wing which is unstressed, either in tension or compression, as the cantilever wing bends.

Figure 6:
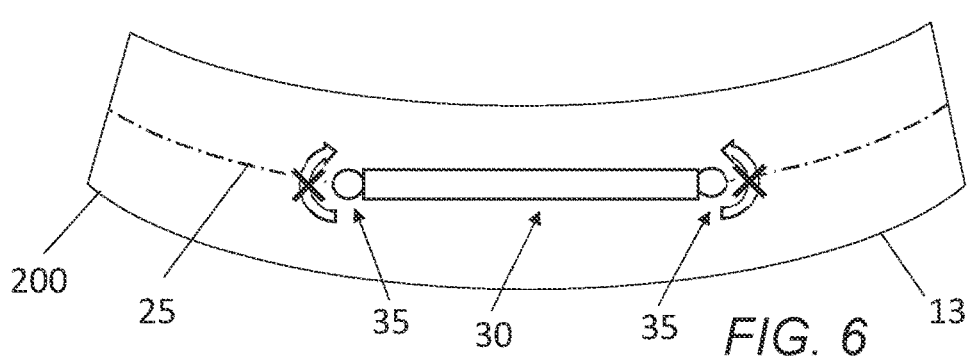
FIG. 6 shows the wing structure of FIG. 5 with the pin joint mounted pop-up spoiler unit on the neutral plane.

FIG. 6 shows the wing 13 in the deflected state 200 and with the pop-up spoiler 30 shown schematically and coupled to the wing structure by the pin joints 35 on the neutral plane 25 to illustrate how the pin joints 35 remain spaced apart by the same distance in the deflected state 200 as in the undeflected state 100, and the pin joints are unable to transfer bending moment from the wing structure into the pop-up spoiler unit 30, thereby isolating the pop-up spoiler unit from the wing bending deflections.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
a wing structure supporting a wing cover having an outer aerodynamic surface, wherein the wing structure includes a neutral plane substantially midway between an upper cover of the wing cover and a lower cover of the wing cover,
a pop-up spoiler unit including an actuation mechanism,
a spoiler coupled to the actuation mechanism of the pop-up spoiler unit, and
pin joints substantially in the neutral plane and mounting the pop-up spoiler unit to the wing structure, wherein the pin joints include a first pin joint between a first end of the pop-up spoiler unit and the wing structure and a second pin joint between a second end of the pop-up spoiler and the wing structure;
wherein the first end and the second end are opposite each other along a spanwise length of the pop-up spoiler unit, and
wherein the spoiler is moveable by the actuation mechanism to deploy through an aperture in the wing cover.

2. The aircraft wing according to claim 1, wherein the pop-up spoiler unit is substantially free to pivot about the pin joints.

3. The aircraft wing according to claim 2, wherein each of the first pin joint and the second pin joint includes a pin having a pin axis substantially in the neutral plane.

4. The aircraft wing according to claim 3, wherein the first pin joint and the second pin joint constrain to pure rotation about the respective pin axis relative motion of the wing structure and the pop-up spoiler unit.

5. The aircraft wing according to claim 1, wherein the spoiler has a length extending substantially in a spanwise direction of the wing, and a height extending substantially in a thickness direction of the wing.

6. The aircraft wing according to claim 1, wherein the spoiler is configured to deploy through the upper cover.

7. The aircraft wing according to claim 1, wherein the aperture is an elongate slot.

8. The aircraft wing according to claim 1, wherein the spoiler is arranged to move in a direction substantially normal to the wing cover.

9. The aircraft wing according to claim 1, wherein the spoiler is moveable between a retracted and an extended position, and
wherein the spoiler does not extend beyond an aerofoil profile of the wing when the spoiler is in the retracted position.

10. The aircraft wing according to claim 9, wherein the spoiler carries a panel, and the panel forms a substantially flush surface with the upper cover when the spoiler is in the retracted position.

11. The aircraft wing according to claim 1, wherein the spoiler unit occupies substantially a full depth of the wing between the upper cover and the lower cover.

12. The aircraft wing according to claim 1, wherein the actuation mechanism is operable to move the spoiler without jamming during wing bending deflections under all normal operating conditions of the aircraft wing.

13. The aircraft wing according to claim 1, wherein the actuation mechanism is operable to move the spoiler when the aircraft wing is in flight or is on the ground under all normal operating conditions of the aircraft wing.

14. The aircraft wing according to claim 1, wherein the aircraft wing is a subsonic or transonic large transport aircraft wing.

15. The aircraft wing according to claim 1, wherein the neutral plane is curved with respect to a spanwise direction of the wing structure, and the spoiler is curved to conform to the neutral plane.

16. The aircraft wing according to claim 1, wherein the neutral plane is curved with respect to a spanwise direction of the wing structure, and the spoiler is curved to conform to the neutral plane.

17. An aircraft wing comprising:
- a neutral plane substantially midway between an upper cover of the wing cover and a lower cover of the wing cover and extending in a spanwise direction of the aircraft wing and perpendicular to the spanwise direction, wherein the neutral plane is curved along the spanwise direction;
- a wing cover including an upper aerodynamic wing surface and a lower aerodynamic wing surface opposite the upper aerodynamic wing surface;
- a spoiler in the upper aerodynamic wing surface, wherein the spoiler, while at a retracted position, is flush with the upper aerodynamic wing surface and extends out from the upper aerodynamic wing surface while at a deployed position;
- a pop-up spoiler unit including an actuation mechanism between the upper aerodynamic wing surface and the lower aerodynamic wing surface, wherein the pop-up spoiler unit is configured to move the spoiler between the retracted position and the deployed position and the pop-up spoiler unit extends in a spanwise direction between opposing ends of the pop-up spoiler unit; and
- joints connecting the pop-up spoiler unit to the spoiler, wherein all of the joints connecting the pop-up spoiler to the spoiler lie substantially in the neutral plane and the joints include end joints each attaching at a respective one of the ends of the pop-up spoiler to a respective internal structure of the aircraft wing.

\* \* \* \* \*